United States Patent Office 2,807,588
Patented Sept. 24, 1957

2,807,588

METHODS OF PREPARING HYDROGELS AND AEROGELS

John F. White, Medford, and William S. Wilson, Brookline, Mass., assignors to Monsanto Chemical Company, St. Louis, Mo., a corporation of Delaware No Drawing. Application September 24, 1953, Serial No. 382,184

19 Claims. (Cl. 252—317)

The present invention relates to novel methods of preparing silica containing hydrogels and inorganic aerogels, particularly silica hydrogels and aerogels.

It has been proposed, heretofore, in Kistler Patent No. 2,093,454, to prepare various organic aerogels and inorganic aerogels by first forming an organic organogel or an inorganic organogel in which the liquid phase consists of an organic liquid such as ethyl alcohol or ethyl ether, confining the resulting product in a pressure vessel, applying heat thereto until the liquid in the gel has reached a temperature at which the surface tension of the liquid is so small as to produce no substantial shrinkage of the gel when the liquid is allowed to evaporate, maintaining such temperature, and then releasing the vapor from the pressure vessel at a rate insufficient to injure the gel. While such process provides excellent aerogels, it is quite expensive to operate because relatively large amounts of organic liquid are used in producing the aerogel and a substantial part of this liquid cannot be recovered. In this same Kistler patent on page 2, column 2, line 64 ff., it is pointed out in substance that silica aerogels cannot be produced from silica gels in which the liquid phase consists of water due to the solvent action of water on silica at high temperatures.

In accordance with the present invention, it is possible to prepare inorganic aerogels, and particularly silica aerogels, easily and economically, from inorganic hydrogels or aquagels which have been processed in a novel manner.

It has also been proposed, heretofore, in Marshall Patent No. 2,285,449, to prepare inorganic aerogels such as silica aerogels by forming an aquasol containing a dissolved inorganic salt and a colloidal inorganic oxide such as colloidal silica, adding to the aquasol a quantity of a water-miscible organic solvent, removing the precipitated inorganic salt, and removing the liquid phase, which consists of water and the organic solvent, from the sol without substantially subjecting the sol to a compressive liquid-solid interface. This process like the Kistler process referred to above produces excellent inorganic aerogels. However, because of the relatively large amounts of organic solvent which are used, and which cannot be recovered completely, the process is relatively expensive for the production of inorganic aerogels.

In accordance with the present invention, it is possible to produce inorganic aerogels, at a considerable reduction in cost over the Marshall process, by preparing inorganic aerogels from specially processed aquasols containing a colloidal inorganic substance.

It is one object of this invention to produce inorganic aerogels, particularly silica aerogels, cheaply and efficiently from inorganic hydrogels or aquagels.

It is a further object of this invention to provide a novel method of producing high quality silica aerogels, at reduced cost, from silica hydrogels or aquagels.

It is a further object of this invention to provide inorganic aerogels, particularly silica aerogels, cheaply and efficiently from hydrosols or aquasols containing a colloidal inorganic substance.

It is a further object of this invention to provide a novel method of producing high quality silica aerogels, at reduced cost, from silica hydrosols or aquasols.

Still further objects and advantages of this invention will become apparent from the following description and the appended claims.

The present invention is based on the discovery that suitable silica aerogels may be prepared from a silica hydrogel or aquagel which is free or substantially free of metallic cations or from a silica aquasol or hydrosol which is free or substantially free of metallic cations by heating such hydrogels or aquasols in a pressure resistant vessel without substantially subjecting the gel or sol to a compressive liquid-solid interface to remove the liquid (water) phase of the gel or sol. The product obtained is a silica aerogel which is comparable in quality and properties to silica aerogels prepared by more costly prior art processes.

In carrying out the methods of this invention, it is essential that the starting silica hydrogel or hydrosol be free or substantially free of metallic cations. For this purpose the term "substantially free" is intended to means less than 0.001% by weight of metallic cations, based on the weight of the hydrogel or hydrosol. Suitable silica hydrogels may be prepared, for example, by first mixing a water-soluble silicate such as sodium silicate with a mineral acid such as sulfuric, hydrochloric or phosphoric acid at a pH of about 3.5 to 4.5 to form an acidic silica hydrosol or aquasol containing a water-soluble metal salt. This sol is allowed to gel either as a mass, as is customary in the manufacture of commercial xerogels, or in the form of beads, as described in the Marisic Patent No. 2,385,217. Ordinarily, the silica hydrogel formed should contain about 5 to 15% of $SiO_2$ by weight, although it is preferred to employ silica hydrogels containing from 6 to 10% of $SiO_2$ by weight. When a mass of silica hydrogel is obtained it is preferably first allowed to synerize to toughen the gel structure, after which the mass is broken up into lumps, preferably lumps of relatively large size, for example, 1 to 3 inches. The hydrogel lumps are then washed to remove metallic cations present as impurities are formed in the preparation of the hydrogel. The washing of the gel lumps or beads may be carried out in several ways, but the particular wash water used is very important. According to one embodiment of the invention, the gel beads or lumps may be washed with distilled water or with demineralized water of comparable purity, for example, natural water from which metallic cations have been removed by passage through a cation-exchange material operating on a hydrogen cycle, until the silica hydrogel is free or substantially free of metallic cations. At this stage the wash water from the hydrogel gives a negative test for the anion of the acid used in preparing the hydrogel, and the washed hydrogel is substantially neutral.

According to another embodiment of the invention, the silica hydrogel containing metallic or metal cations may be washed with acidified water such as acidified distilled water or with acidified demineralized water of comparable purity or with acidified natural water containing the amounts of metallic cations normally or ordinarily present in natural water. In such instances the washing of the hydrogel is carried out until the hydrogel is free or substantially free of metallic cations. When this stage is reached the hydrogel will also be free or substantially free of any combined metals, that is, metals such as sodium, calcium or magnesium combined either chemically or by weak electrical forces with the silica in the hydrogel. Washing the silica hydrogels with acidified water thus differs from washing with distilled water or demineralized water in that in the latter case the metals combined with the silica in the hydrogel are not removed from the hydrogel. This difference is of considerable importance for certain uses of aerogels since the aerogels produced from hydrogels which have been washed with acidified water and are free of metallic cations and combined metals, are quite friable and have not undergone excessive shrinkage, whereas aerogels produced from hydrogels which are washed with distilled water or demineralized water, and are free only of metallic cations but not of metal combined with silica, are hard and have undergone greater shrinkage.

In washing the silica hydrogel with acidified water, the extent to which the water is acidified is important. In general, the pH of the wash water should not be appreciably below 1.5 since at lower pH values the aerogels produced from the washed hydrogels show excessive shrinkage. The upper limit depends on the particular water used. In the case of distilled water or demineralized water the pH may be as high as 5, but in the case of natural water the pH should not be appreciably above 4 otherwise inferior, chalky products are obtained. It is thus seen that the general pH range of the wash water is between about 1.5 and 5. However, in order to obtain excellent results consistently, the pH of the wash water should preferably be between about 2 and 3. The wash water may be adjusted to the foregoing pH values with mineral acids such as sulfuric, hydrochloric or phosphoric acids or with strong organic acids such as formic and acetic acids. The washed hydrogel will, in such instances, have a pH corresponding substantially to the pH of the wash water employed. The preferred acids are volatile acids such as hydrochloric or organic acids because the hydrogels washed with water containing such acids provide aerogels which are substantially free of electrolytes.

The use of acidified natural water, that is, natural water, adjusted to the proper pH with acid, and which contains, for example, about 10 to 300 parts per million of mineral or inorganic matter is very important for washing the hydrogel, since the use of natural water which has not been acidified results in inferior, chalky products which are not suitable as aerogels due to the adsorption of metallic cations from the water by the hydrogel during the washing of the hydrogel.

Suitable silica hydrogels which are free or substantially free of metallic cations may also be prepared in other ways. Thus, it is possible to produce suitable silica hydrogels by first passing a water-soluble silicate through a bed of cation-exchange material in hydrogen form until an acidic silica aquasol which is substantially free of metallic cations is obtained. In general, this result may be achieved by collecting that portion of the effluent which is obtained before the break through point of the bed is reached. The break through point is reached when the bed fails to adsorb the metallic cations from the silicate passing through the bed. The pH of the collected effluent or ion-exchange sol is quite critical and should not be appreciably below 1.5 or above 3.0. However, best results are obtained in the production of aerogels when the ion-exchange sol has a pH between about 2.0 and 2.5, and accordingly such sols are preferred. In preparing hydrogels from hydrosols of this type, it is desirable to employ a silicate solution which will provide a final product having a minimum silica content of about 5%. The maximum silica content may be as high as 15%, but in practice it is difficult to obtain a product having a silica content above 9%, even when silicates of special $Na_2O$ to $SiO_2$ ratios are used or refrigeration of the silicate solution is resorted to, due to gel formation in the cation-exchange bed. The ion-exchange sols, as prepared above, are allowed to gel, thus forming a silica hydrogel which is free or substantially free of metallic cations and which may be used to prepare silica aerogels without further treatment.

Silica hydrogels which are free or substantially free of metallic cations may also be prepared by first reacting a water-soluble silicate such as sodium silicate with a mineral acid such as sulfuric, phosphoric or hydrochloric acid to provide an acidic silica aquasol containing a water-soluble metal salt and a silica content between about 5 and 15%, and preferably between 6 and 10%. This sol is then cooled to a temperature which may range from just above the freezing point up to about 10° C. or may be prepared at such temperature to precipitate a substantial part of the electrolyte, for example, the salt of the mineral acid, formed by the reaction of the silicate and the acid. The precipitated electrolyte is then removed from the sol by filtration or centrifugation or the like, after which the sol is passed through a bed of cation-exchange material in the hydrogen form to remove metallic cations from the sol. If desired, the sol may then be passed through a bed of anion-exchange material to remove anions from the sol. However, this latter step is not essential providing the pH of the sol is at least 1.5. The sol is then allowed to gel, preferably at room temperature, to form the silica hydrogel which may then be used to prepare the corresponding aerogel without further treatment. The silica aerogel produced from such hydrogel is comparable in quality to the aerogels produced from hydrogels which have been washed with acidified water.

As was mentioned previously herein, suitable aerogels may also be produced from silica hydrosols or aquasols which are free or substantially free of metallic cations. Suitable hydrosols may be prepared by passing a water-soluble silicate through a bed of cation-exchange material operating on a hydrogen cycle until an acidic silica aquasol which is substantially free of metallic cations is obtained. In general, this result may be achieved by collecting that portion of the effluent which is obtained before the break through point of the bed is reached. The break through point is reached when the bed fails to adsorb the metallic cations from the silicate passing through the bed. The pH of the collected effluent or ion-exchange sol is quite critical and should not be appreciably below 1.5 or above 3. However, best results are obtained in the production of aerogels when the ion-exchange sol has a pH between about 2 and 2.5, and accordingly such sols are preferred. In preparing hydrosols of this type, it is desirable to employ a silicate solution which will provide a final sol having a minimum silica content of about 5%. The maximum silica content may be as high as 15%, but in practice it is difficult to obtain a sol having a silica content above 9%, even when silicates of special $Na_2O$ to $SiO_2$ ratios are used or refrigeration of the silicate solution is resorted to, due to gel formation in the cation exchange bed.

Suitable hydrosols may also be prepared by first mixing a water-soluble silicate such as sodium silicate with a mineral acid such as sulfuric, hydrochloric or phosphoric acid to provide a sol having a pH between about 2 and 4. The sol may have a silica content between about 5 and 15% and preferably between 6 and 10%. This sol is then cooled to a temperature which may range from just above the freezing point to about 10° C. or may be prepared at such temperatures to precipitate a substantial part of the electrolyte, for example, sodium sulfate, sodium chloride or sodium phosphate, formed by the reaction of the silicate and the acid. The precipitated electrolyte is then removed from the sol by filtration or centrifugation or the like, after which the sol is passed through a bed of cation-exchange material operating on the hydrogen cycle to remove metallic cations from the sol. If desired, the sol may then be passed through a bed of anion-exchange material to remove anions from the sol, but this step is not essential providing the pH of the sol is at least 1.5.

In preparing demineralized water or the hydrogels or hydrosols by means of cation-exchange materials, a large variety of cation-exchange materials which operate on the hydrogen cycle may be used. For example, phenol-formaldehyde resins, phenol-formaldehyde resins containing sulfonic acid groups, sulfonated coal, copolymers of styrene and divinyl benzene containing nuclear sulfonic acid groups, hydrolyzed copolymers of styrene and maleic anhydride cross-linked with divinyl benzene and reaction products of polyhydric alcohols and copolymers of vinyl acetate and maleic anhydride and the like, which resins are water-insoluble and in granular form, may be used. When it is stated that the cation-exchange material operates on the hydrogen cycle, it is meant that the cation-exchange material which is in hydrogen form exchanges its hydrogen cations for metallic cations in the water or sol passed through the exchanger, and the cation-exchange material is usually treated with acid prior to use or after it is exhausted to change it to the hydrogen form.

In removing anions to prepare demineralized water or in removing anions in the preparation of the hydrogels or hydrosols, a large variety of anion-exchange materials may be used. For example, it is possible to use resins prepared from aromatic amines and formaldehyde, or from a polyamine, phenol and formaldehyde or from guanidine and formaldehyde, and it is also possible to use water-insoluble copolymers of styrene and divinyl benzene containing nuclear amine groups.

As is stated previously herein, the silica aerogels of this invention are prepared by heating the silica hydrogels or hydrosols which are free or substantially free of metallic cations, in a pressure resistant vessel, without subjecting the gel or sol to a substantial compressive liquid-solid interface, to remove the liquid (water) phase from the gel or sol. The technique described in the Kistler Patent No. 2,093,454 may be used in which case heat is applied until the water in the gel or sol has reached a temperature at which the surface tension of the water is so small as to produce no substantial (usually less than 45%) shrinkage of the gel or sol when the water is allowed to evaporate, after which the temperature is maintained and the water vapor is released from the pressure vessel at a rate insufficient to injure the gel, which has by this time been formed whether a gel or sol is used as the starting material. The technique described in Kistler Patent No. 2,249,767 may also be used in which case the gel or sol is heated in a pressure resistant apparatus and the pressure is allowed to increase to or above the critical pressure of water, after which the pressure is maintained at the selected point by releasing portions of water from time to time as the pressure tends to rise and the heating is continued until the critical temperature has been reached or passed whereupon the water, which has now been converted into the gaseous form, is allowed to escape from the apparatus. However, contrary to the statement in the Kistler Patent No. 2,093,454, page 2, column 2, line 70 ff. or in the Kistler Patent No. 2,249,767, page 2, column 1, line 39 ff., the silica is not dissolved by water near or at the critical temperature of water. When the hydrosols are used to prepare aerogels, the technique described in the Marshall Patent No. 2,285,449 may be used. When the hydrosols are charged to a pressure resistant vessel and then heated, the sol is first converted to a gel in situ and the removal of water from the gel is accomplished in the same manner as in the case of a hydrogel.

In carrying out the removal of water from the hydrogels or hydrosols, it is necessary to heat the gel or sol in a closed zone or system, in which the pressure may be controlled as desired, for example, in an autoclave, until the critical pressure of water vapor, which is about 3250 pounds per square inch gauge, is reached. The maximum pressure is not critical and depends primarily on the strength of the equipment used. Usually, however, it is not necessary to exceed a pressure of 10,000 pounds per square inch. The temperature of the gel is raised until it is at least 340° C. and thereafter water vapor may be released very slowly from the closed system so as not to injure the gel structure. The temperature is then maintained or raised, as desired, while releasing water vapor slowly until essentially all of the water vapor is released from the closed system. Although a temperature of 340° C. is below the critical temperature of water, satisfactory results may be obtained by operating at such temperature. On the other hand, some shrinkage of the gel does occur and it is preferable to avoid this shrinkage by operating at least at the critical temperature of water which is about 370° C. Higher temperatures may also be used, for example, temperatures up to about 500° C., but it is preferred not to exceed a temperature of about 450° C.

In charging the hydrogel or hydrosol to the closed system prior to heating, it is desirable that the gel or sol should occupy about 50 to 75% of the volume of the system. If the volume occupied is too small there is a tendency for excessive shrinkage during heating. On the other hand, if the volume occupied is too large there is a danger that the vessel or autoclave will be damaged due to hydrostatic pressure. When hydrogels are charged to a closed system and heated there is a definite tendency for the gel to shrink unless it is covered with water prior to heating so it is preferred to cover the hydrogel with water. The water used may be distilled water, demineralized water of equivalent purity or acidified water, as hereinbefore described, but for best results it is preferred to use acidified water.

In general, the silica aerogels prepared according to the processes of this invention are more transparent than those prepared from the alcosols or alcogels by the prior art processes. They may be used as flatting agents in coating composition, as thickening agents for lubricating oils and for thermal insulating purposes. The aerogels are essentially free of salts. The aerogels prepared from hydrogels washed or finally rinsed with distilled or demineralized water are especially useful for applications where the low electrical conductivity of such aerogels is of importance. This is also true of aerogels prepared from hydrogels washed with acidified water containing a volatile acid.

Although the present invention has been described primarily with respect to the preparation of silica aerogels from silica hydrogels or silica hydrosols, the present invention is also applicable to the preparation of other silica containing inorganic aerogels from silica containing inorganic hydrogels or inorganic hydrosols which are free or substantially free of metallic cations. Thus, the invention is applicable to the preparation of silica-alumina co-aerogels from silica-alumina co-hydrosols or co-hydrogels which are free or substantially free of metallic cations and the like.

A further understanding of the methods of the present invention will be obtained from the following specific examples which are intended to illustrate the invention, but not to limit the scope thereof, parts and percentages being by weight unless otherwise specified.

*Example 1*

An aquasol containing 8% $SiO_2$ was prepared by adding, with stirring, a solution of 140 parts of water and 200 parts of sodium silicate solution containing 20% $SiO_2$ and having an $SiO_2$ to $Na_2O$ ratio of 3.2 to 1 to a solution of 140 parts of water and 20.4 parts of 97% sulfuric acid at a temperature of 5° C. until a pH of about 4.0 was obtained while maintaining the temperature between 5 and 10° C. The sol was allowed to gel at room temperature and was then broken up into lumps of about 3 inch size. These lumps were washed with distilled water of substantially zero hardness until the wash water from the gel lumps gave a negative test for sulfate ions when treated with barium chloride. At this stage the gel lumps were free of metallic cations. The gel lumps were then charged to a glass liner in a radiant-heated autoclave and covered with distilled water to occupy about 75% of the volume of the autoclave. The autoclave was then heated until a pressure of 3600 pounds per square inch (gauge) was attained, after which vapor was released intermittently from the autoclave to maintain this pressure and the temperature was raised to 400° C. The water vapor in the autoclave was then released and the autoclave was cooled. The silica aerogel product from the autoclave was hard and transparent, had a density of 7.1 pounds per cubic foot in the form of 16–20 mesh particles and a thermal conductivity of about 0.18 B. t. u.-inch/hour per square foot per degree Fahrenheit at 99° F. This product is suitable for thermal insulation.

*Example II*

An aquasol containing 8% $SiO_2$ was first prepared by adding a sodium silicate solution to a sulfuric acid solution, as described in Example I, and the sol was then allowed to gel. After undergoing syneresis for 24 hours the gel was broken up into 3 inch lumps and was then washed with natural water having a hardness of 20 parts per million calculated as calcium carbonate and acidified to a pH of 2 with sulfuric acid. The washing was continued for 44 hours at which time the gel was free of metallic cations and was also free of metals combined with silica. The gel lumps were charged to an autoclave and covered with wash water not used in the washing of the gel lumps until the gel and water occupied about 70% of the volume of the autoclave. The autoclave was then heated until a pressure of 3600 pounds per square inch (gauge) was attained, after which water vapor was released intermittently from the autoclave to maintain this pressure. This procedure was continued until the temperature rose to 365° C. at which time the water vapor was released from the autoclave and the autoclave was cooled. The product, as removed from the autoclave, was a transparent, friable silica aerogel having a density of 7.75 pounds per cubic foot in the form of 16–20 mesh particles. This product is suitable, when comminuted, as a flatting agent for coating compositions.

*Example III*

An aqueous solution of sodium silicate containing 7% $SiO_2$ and 2.1% $Na_2O$ was passed upwardly through a bed of cation-exchange resin in hydrogen form (Amberlite IR–100, which is a water-insoluble, granular phenolformaldehyde resin containing sulfonic acid groups) until the total effluent from the bed had a pH of 2.5–2.6. At this stage, the effluent, which consisted of water and about 7% of colloidal $SiO_2$, was free of metallic cations. This sol was then charged to an autoclave in an amount such as to occupy about 75% of the volume of the autoclave. The autoclave was then heated until a pressure of 3600 pounds per square inch (gauge) was attained, during which time the sol was converted to a silica hydrogel in situ. Heating was continued and water vapor was released intermittently from the autoclave to maintain the pressure at 3600 pounds per square inch (gauge) until a temperature of 400° C. was attained. The water vapor in the autoclave was then released slowly and the autoclave was cooled. The silica aerogel product obtained was translucent and had a bulk density of 5 pounds per cubic foot. This aerogel is useful for thermal insulation.

*Example IV*

A silica aerogel of good quality was prepared as described in Example III, with the exception that the silica aquasol obtained after passage through the cation-exchange material was allowed to gel at room temperature before it was charged to the autoclave.

*Example V*

A silica aquasol containing 8% $SiO_2$ was prepared by adding, with stirring, a solution of 140 parts of water and 200 parts of aqueous sodium silicate containing 20% $SiO_2$ and having a silica to $Na_2O$ ratio of 3.2 to 1 to a solution of 140 parts of water and 21.4 parts of 97% sulfuric acid until a pH of about 3 was obtained, while maintaining the ingredients at a temperature of 2° C. The resulting sol was then allowed to stand for about 60 minutes to permit precipitation of sodium sulfate crystals. The sol was then filtered to remove sodium sulfate crystals and then passed through a bed of cation-exchange material in the hydrogen form (a water-insoluble, granular copolymer of styrene and divinyl benzene containing nuclear sulfonic acid groups) to remove sodium and other metallic cations from the sol. The sol was then charged to an autoclave and converted to an aerogel using the procedure described in Example III. The silica aerogel obtained was comparable in quality and properties to the silica aerogel prepared as described in Example II.

What is claimed is:

1. A method of preparing inorganic aerogels containing silica which comprises heating a substance selected from the group consisting of (1) silica containing inorganic hydrogels having an $SiO_2$ content of about 5 to 15% by weight, a pH varying from about 1.5 up to substantially neutral and containing less than 0.001% by weight of metallic cations and (2) silica containing inorganic hydrosols having an $SiO_2$ content of about 5 to 15% by weight, a pH of about 1.5 to about 3.0 and containing less than 0.001% by weight of metallic cations, in a closed system without subjecting the substance to a substantial compressive water-solid interface until the water in said substance is converted to water vapor, and allowing water vapor to escape from said closed system without substantially injuring the gel structure of said substance.

2. A method of preparing silica aerogels which comprises first forming a silica hydrogel having an $SiO_2$ content of about 5 to 15% by weight and a pH between about 1.5 and 5 and containing less than 0.001% by weight of metallic cations, heating the hydrogel in a closed system until the water in the hydrogel has reached a temperature at which the surface tension of the water is so small as to produce no substantial shrinkage of the hydrogel when the water is allowed to evaporate and maintaining the temperature of the hydrogel and releasing water vapor from the closed system at a rate insufficient to injure the gel structure.

3. A method of preparing silica aerogels which comprises the steps of washing a silica hydrogel containing from about 5 to 15% by weight of $SiO_2$ and a water-soluble metal salt with a substance selected from the group consisting of distilled water and demineralized water equivalent in purity to distilled water until said hydrogel is substantially neutral and contains less than 0.001% by weight of metallic cations, heating the resulting hydrogel in a closed system at a gauge pressure of at least 3250 pounds per square inch without subjecting the gel to a substantial compressive water-solid interface until the water in said hydrogel is converted to water vapor, and allowing water vapor to escape from said closed system during the heating stage while maintaining the gel structure of the hydrogel substantially unimpaired.

4. A method of preparing a silica aerogel which comprises the steps of washing a silica hydrogel containing from about 5 to 15% of $SiO_2$ and a water-soluble metal salt with acidified water having a pH of about 1.5 to 5 until said hydrogel is substantially at the same pH as said water and contains less than 0.001% by weight of metallic cations, heating the resulting hydrogel in a closed system at a gauge pressure of at least 3250 pounds per square inch without subjecting the gel to a substantial compressive water-solid interface until the water in said hydrogel is converted to water vapor, and allowing water vapor to escape from said closed system during the heating stage while maintaining the gel structure of the hydrogel substantially unimpaired.

5. A method as in claim 4, but further characterized in that the acidified water is acidified natural water containing mineral impurities and having a pH of about 1.5 to 4.0.

6. A method of preparing silica aerogels which compries the steps of washing a silica hydrogel containing from about 6 to 10% by weight and a sodium salt of a mineral acid with acidified natural water containing mineral impurities and having a pH of about 1.5 to 4 until the hydrogel has a pH of about 1.5 to 4 and contains less than 0.001% by weight of metallic cations, heating the resulting hydrogel in a closed system at a gauge pressure of at least 3250 pounds per square inch and to a temperature of 340 to 500° C., until the water in the hydrogel is converted to water vapor, and releasing water vapor from the closed system during the heating stage at a rate insufficient to injure the gel structure.

7. A method as in claim 6, but further characterized in that the washed hydrogel is covered with acidified natural water in the closed system prior to heating.

8. A method of preparing silica aerogels which comprises the steps of forming an acidic silica aquasol having an $SiO_2$ content of about 5 to 15% by weight and a pH of about 1.5 to about 3 and containing less than 0.001% by weight of metallic cations, allowing said aquasol to gel, heating the resulting gel in a closed system at a gauge pressure of at least 3250 pounds per square inch without subjecting the gel to a substantial compressive water-solid interface until the water in the gel is converted to water vapor, and allowing water vapor to escape from the closed system during the heating stage at a rate insufficient to injure the gel structure.

9. A method of preparing silica aerogels which comprises the steps of contacting an aqueous solution of water-soluble silicate with a cation-exchange material until an acidic silica aquasol having an $SiO_2$ content of about 5 to 15% by weight and a pH of about 1.5 to about 3 and containing less than 0.001% by weight of metallic cations is obtained, allowing said aquasol to gel, heating the gel in a closed system at a gauge pressure of at least 3250 pounds per square inch until the water in said gel is converted to water vapor without subjecting the gel to a substantial compressive water-solid interface and allowing water vapor to escape from said closed system during the heating stage while maintaining the gel structure substantially unimpaired.

10. A method of preparing silica aerogels which comprises the steps of forming an acidic silica aquasol containing from about 5 to 15% by weight of $SiO_2$ and a water-soluble metal salt, cooling the aquasol to precipitate part of said salt, separating the precipitated salt from the aquasol, contacting the aquasol with cation-exchange material in hydrogen form until said aquasol has a pH of about 1.5 to about 3 and contains less than 0.001% by weight of metallic cations, allowing the resulting aquasol to gel, heating the gel in a closed system at a gauge pressure of at least 3250 pounds per square inch without subjecting the gel to a substantial compressive water-solid interface until the water in said gel is converted to water vapor, and allowing water vapor to escape from said closed system during the heating stage while preventing substantial injury to the gel structure.

11. A method of preparing silica aerogels which comprises the steps of forming an acidic silica aquasol having an $SiO_2$ content of about 5 to 15% by weight and a pH of about 1.5 to about 3 and containing less than 0.001% by weight of metallic cations, heating the aquasol in a closed system, thereby converting the aquasol to a gel, continuing the heating until the water in the gel has reached a temperature at which the surface tension of the water is so small as to produce no substantial shrinkage of the gel when the water is allowed to evaporate and maintaining the temperature of the gel and releasing water vapor from the closed system at a rate insufficient to injure the gel structure.

12. A method of preparing silica aerogels which comprises the steps of contacting an aqueous solution of water-soluble silicate with a cation-exchange material in hydrogen form until an acidic silica aquasol having from about 5 to 15% by weight of $SiO_2$ and a pH of about 1.5 to about 3 and containing less than 0.001% by weight of metallic cations is obtained, heating the resulting aquasol in a closed system, thereby converting said aquasol to a hydrogel, continuing the heating without subjecting the hydrogel to a substantial compressive water-solid interface until the water in said hydrogel is converted to water vapor and releasing water vapor from the closed system during the heating stage while substantially maintaining the gel structure of said hydrogel.

13. A method as in claim 12, but further characterized in that the silicate solution is contacted with the cation-exchange material by passing the silicate solution through a bed of the cation-exchange material.

14. A method of preparing silica aerogels which comprises the steps of passing an aqueous solution of sodium silicate through a bed of cation-exchange material in hydrogen form until a silica aquasol having from about 5 to 9% by weight of $SiO_2$ and a pH of about 2 to 2.5 and containing less than 0.001% by weight of metallic cations is obtained, heating said aquasol in a closed system, thereby converting said aquasol to a hydrogel, continuing the heating at a gauge pressure of at least 3250 pounds per square inch and at a temperature of 340 to 500° C. until the water in the hydrogel is converted to water vapor and releasing water vapor from the closed system during the heating stage while substantially maintaining the gel structure of said hydrogel.

15. A method of preparing silica aerogels which comprises the steps of forming an acidic silica aquasol containing from about 5 to 15% by weight of $SiO_2$ and a water-soluble metal salt, cooling the aquasol to precipitate a part of said metal salt, separating the precipitated metal salt from the aquasol, contacting the aquasol with a cation-exchange material in hydrogen form until said aquasol has a pH of about 1.5 to about 3 and contains less than 0.001% by weight of metallic cations, heating the resulting aquasol in a closed system, thereby converting the aquasol to a hydrogel, continuing the heating without subjecting the hydrogel to a substantial compressive water-solid interface until the water in said hydrogel is converted to water vapor and releasing the water vapor from the closed system during the heating stage while substantially maintaining the gel structure of the hydrogel.

16. A method of preparing silica aerogels which comprises the steps of forming an acidic silica aquasol containing from about 6 to 10% by weight of $SiO_2$ and a sodium salt of a mineral acid, cooling said aquasol to precipitate a part of said salt, separating the precipitated salt from the aquasol, passing the aquasol through a bed of cation-exchange material in hydrogen form until said aquasol has a pH of about 1.5 to about 3 and contains less than 0.001% by weight of metallic cations, heating the resulting aquasol in a closed system, thereby converting said aquasol to a hydrogel, continuing the heating at a gauge pressure of at least 3250 pounds per square inch and at a temperature of 340 to 500° C. until the water in the hydrogel is converted to water vapor and releasing water vapor from the closed system during the heating stage while substantially maintaining the gel structure of said hydrogel.

17. A method of preparing silica hydrogels which are substantially free of metallic cations which comprises washing a silica hydrogel containing from about 5 to 15% by weight of $SiO_2$ and a water-soluble metal salt with a substance selected from the group consisting of distilled water and demineralized water equivalent in purity to distilled water until said hydrogel is substantially neutral and contains less than 0.001% by weight of metallic cations.

18. A method of preparing a silica hydrogel which is substantially free of metallic cations and metals combined with silica which comprises washing a silica hydrogel containing from about 5 to 15% by weight of $SiO_2$ and a water-soluble metal salt with acidified water having a pH of about 1.5 to 4 until said hydrogel has a pH substantially the same as said acidified water and contains less than 0.001% by weight of metallic cations and combined metals.

19. A method as in claim 18, but further characterized in that the acidified water is natural water acidified to a pH of 2 to 3 with hydrochloric acid.

References Cited in the file of this patent

UNITED STATES PATENTS

| | | |
|---|---|---|
| 2,093,454 | Kistler | Sept. 21, 1937 |
| 2,249,767 | Kistler | July 22, 1941 |
| 2,285,449 | Marshall | June 9, 1942 |
| 2,684,340 | Baral et al. | July 20, 1954 |
| 2,708,186 | Kimberlin | May 10, 1955 |

UNITED STATES PATENT OFFICE
CERTIFICATE OF CORRECTION

Patent No. 2,807,588

September 24, 1957

John F. White et al.

It is hereby certified that error appears in the printed specification of the above numbered patent requiring correction and that the said Letters Patent should read as corrected below.

Column 8, line 64, after "15%" insert -- by weight --; column 9, line 4, after "to" insert -- about --; line 7, after "10%" insert -- of $SiO_2$ --.

Signed and sealed this 7th day of January 1958.

(SEAL)
Attest:
KARL H. AXLINE
Attesting Officer

ROBERT C. WATSON
Commissioner of Patents